(12) United States Patent
Ozaki

(10) Patent No.: US 9,595,769 B2
(45) Date of Patent: Mar. 14, 2017

(54) TERMINAL TEMPORARY HOLDING STRUCTURE AND RESOLVER INCLUDING TERMINAL TEMPORARY HOLDING STRUCTURE

(71) Applicant: Japan Aviation Electronics Industry, Ltd., Tokyo (JP)

(72) Inventor: Yoshiaki Ozaki, Tokyo (JP)

(73) Assignee: JAPAN AVIATION ELECTRONICS INDUSTRY, LTD., Tokyo (JP)

( * ) Notice: Subject to any disclaimer, the term of this patent is extended or adjusted under 35 U.S.C. 154(b) by 162 days.

(21) Appl. No.: 14/412,345

(22) PCT Filed: Mar. 26, 2013

(86) PCT No.: PCT/JP2013/002041
§ 371 (c)(1),
(2) Date: Dec. 31, 2014

(87) PCT Pub. No.: WO2014/010149
PCT Pub. Date: Jan. 16, 2014

(65) Prior Publication Data
US 2015/0188241 A1     Jul. 2, 2015

(30) Foreign Application Priority Data
Jul. 10, 2012   (JP) .................................. 2012-154733

(51) Int. Cl.
*H01R 4/02*         (2006.01)
*G01D 5/14*         (2006.01)
(Continued)

(52) U.S. Cl.
CPC .............. *H01R 4/027* (2013.01); *G01D 5/14* (2013.01); *G01D 5/20* (2013.01); *H02K 15/0062* (2013.01); *H02K 3/522* (2013.01)

(58) Field of Classification Search
CPC . G01D 5/14; G01D 5/20; H01R 4/027; H01R 43/0263; H02K 15/0062; H02K 3/522
(Continued)

(56) References Cited

U.S. PATENT DOCUMENTS 7,034,226 B2 *  4/2006  Adachi ................. B23K 20/10
                                                                174/117 F
2007/0167066 A1  7/2007  Hara et al.
(Continued)

FOREIGN PATENT DOCUMENTS

JP      S61-156455 A     7/1986
JP      11-136900 A      5/1999
(Continued)

OTHER PUBLICATIONS

Extended European Search Report dated Apr. 15, 2016, including the Supplementary European Search Report and the European Search Opinion, in connection with corresponding EP Application No. 13816393.6 (8 pgs.).
(Continued)

*Primary Examiner* — Jay Patidar
(74) *Attorney, Agent, or Firm* — Maier & Maier, PLLC

(57) ABSTRACT

A terminal temporary holding structure includes: winding terminals each including a winding-side spot-welded portion having a flat plate shape; a terminal holding base that holds the winding terminals; and cable terminals each including a cable-side spot-welded portion having a flat plate shape and respectively connected with external cables. The cable terminals are temporarily held by the terminal holding base in such a manner that the winding-side spot-welded portion and the cable-side spot-welded portion are opposed to each other, so as to weld the cable-side spot-welded portion of each cable terminal to the winding-side spot-welded portion of each winding terminal. The cable terminals are tempo-
(Continued)

rarily held by the terminal holding base at at least two locations that sandwich the cable-side spot-welded portion.

6 Claims, 16 Drawing Sheets

(51) Int. Cl.
     *G01D 5/20*         (2006.01)
     *H02K 15/00*      (2006.01)
     *H02K 3/52*        (2006.01)

(58) Field of Classification Search
     USPC .......................... 324/207.2–207.25; 439/449
     See application file for complete search history.

(56) References Cited

U.S. PATENT DOCUMENTS

| 2008/0169714 A1 | 7/2008 | Kataoka et al. |
| 2012/0126646 A1 | 5/2012 | Nakagawa et al. |

FOREIGN PATENT DOCUMENTS

| JP | 2004-153891 A | 5/2004 |
| JP | 2009232583 A | 10/2009 |
| JP | 2011-254676 A | 12/2011 |
| JP | 2012-110188 A | 6/2012 |

OTHER PUBLICATIONS

International Search Report dated May 21, 2013 from corresponding International Patent Application No. PCT/JP2013/002041; 4 pages.

\* cited by examiner

TERMINAL TEMPORARY HOLDING STRUCTURE AND RESOLVER INCLUDING TERMINAL TEMPORARY HOLDING STRUCTURE

TECHNICAL FIELD

The present invention relates to a terminal temporary holding structure and a resolver including the terminal temporary holding structure.

BACKGROUND ART

As a technique of this type, Patent Literature 1 discloses a resolver of an electric motor which is used as a brushless motor. As shown in FIG. 16 of this application, a conductive harness connection terminal 100 around which a resolver winding is wound is embedded in a terminal holding portion 101 which is made of resin. The terminal holding portion 101 has an opening 102 formed therein to allow the harness connection terminal 100 to be exposed. A connection portion 104 is attached to a sensor terminal 103 for deriving an output signal from the resolver. The connection portion 104 is composed of a wide portion 105 and a disc portion 106. Protrusions 107 are integrally formed on both sides of the wide portion 105 in the width direction thereof. When the connection portion 104 is fitted into the opening 102, the protrusions 107 are press-fitted into the opening 102. After that, the disc portion 106 of the connection portion 104 is spot-welded to the harness connection terminal 100.

CITATION LIST

Patent Literature

[Patent Literature 1] Japanese Unexamined Patent Application Publication No. 2009-232583

SUMMARY OF INVENTION

Technical Problem

However, in the structure disclosed in Patent Literature 1, if an external force acts on the sensor terminal 103, the disc portion 106 of the connection portion 104 may be suspended in such a manner that the disc portion 106 is separated from the harness connection terminal 100, which causes an adverse effect on spot welding.

It is an object of the present invention to provide a technique for maintaining a position of a terminal which is temporarily held by a housing, even when an external force acts on an external cable.

Solution to Problem

According to an aspect of the present invention, a terminal temporary holding structure is provided, including: a first terminal including a first welded portion having a flat plate shape; a housing that holds the first terminal; and a second terminal that is connected with an external cable and includes a second welded portion having a flat plate shape, the second terminal being temporarily held by the housing in such a manner that the first welded portion and the second welded portion are opposed to each other, so as to weld the second welded portion of the second terminal to the first welded portion of the first terminal. In the terminal temporary holding structure, the second terminal is temporarily held by the housing at at least two locations that sandwich the second welded portion.

Preferably, the second terminal is sandwiched between the first terminal and the housing in a direction orthogonal to the first welded portion of the first terminal.

Preferably, the second terminal further includes a pair of temporary held portions disposed so as to sandwich the second welded portion. The housing includes a pair of temporary holding portions opposed to the pair of temporary held portions of the second terminal in the direction orthogonal to the first welded portion of the first terminal.

Preferably, a pair of elastic connecting portions extending in a direction different from a direction parallel to the second welded portion is formed between the second welded portion and a corresponding one of the pair of temporary held portions.

Preferably, the first terminal is located between the pair of elastic connecting portions in a state where the second terminal is temporarily held by the housing.

Preferably, the pair of temporary holding portions is formed so as to be elastically displaceable in a direction in which the temporary holding portions are separated from each other.

Preferably, the pair of temporary holding portions has an inclined guide surface formed thereon, the inclined guide surface being inclined in such a manner that the pair of temporary holding portions approaches each other in a direction from the second terminal to the first terminal.

A resolver is provided, including: the terminal temporary holding structure set forth in any one of the above aspects, and the external cable connected to the second terminal.

Advantageous Effects of Invention

According to the present invention, it is possible to maintain a position of the second terminal which is temporarily held by the housing, even when an external force acts on the external cable.

DESCRIPTION OF EMBODIMENTS

First Embodiment

A first embodiment of the present invention will be described below with reference to FIGS. 1 to 10.

Figure 1:
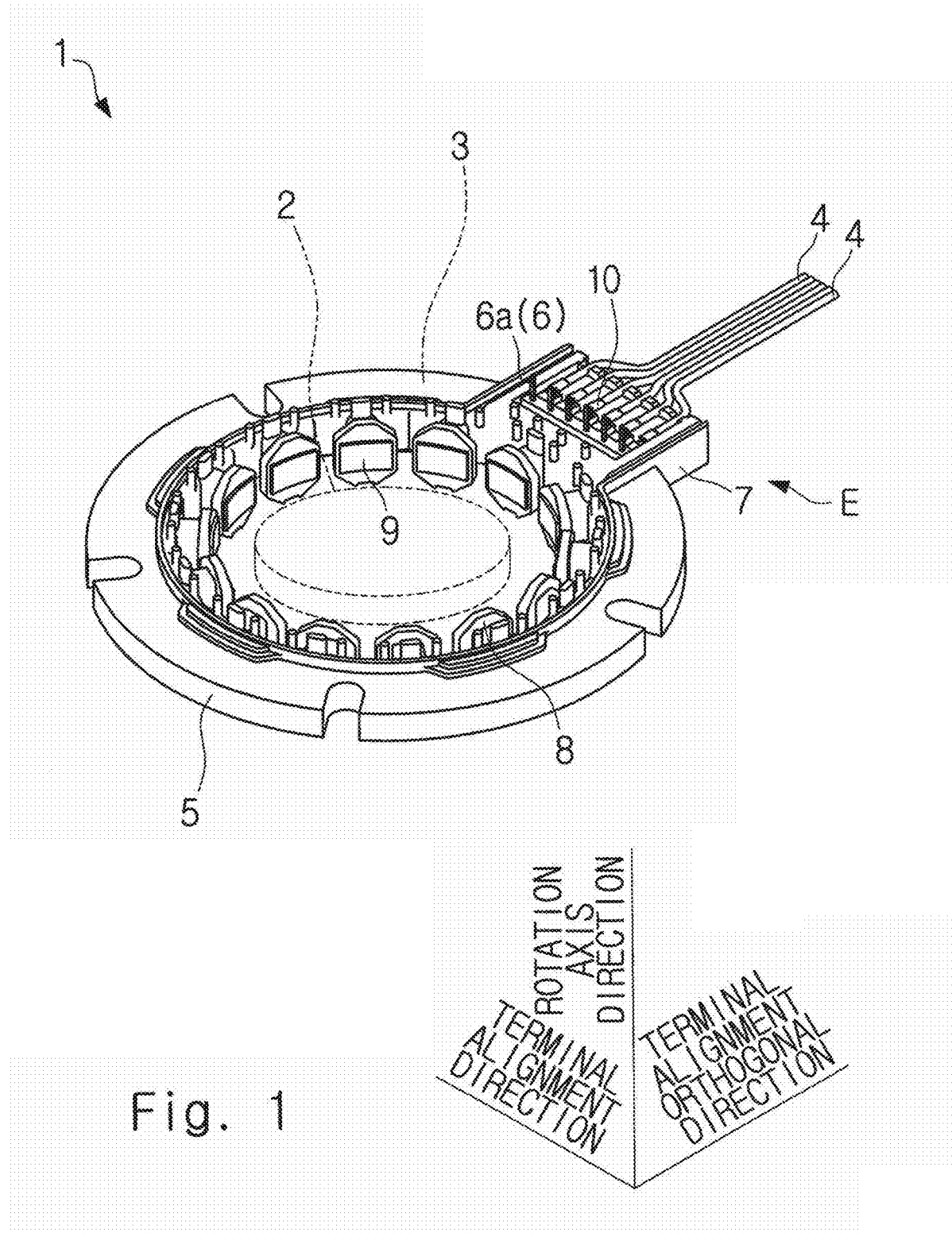
FIG. 1 is a perspective view of a resolver (first embodiment)
Figure 2:
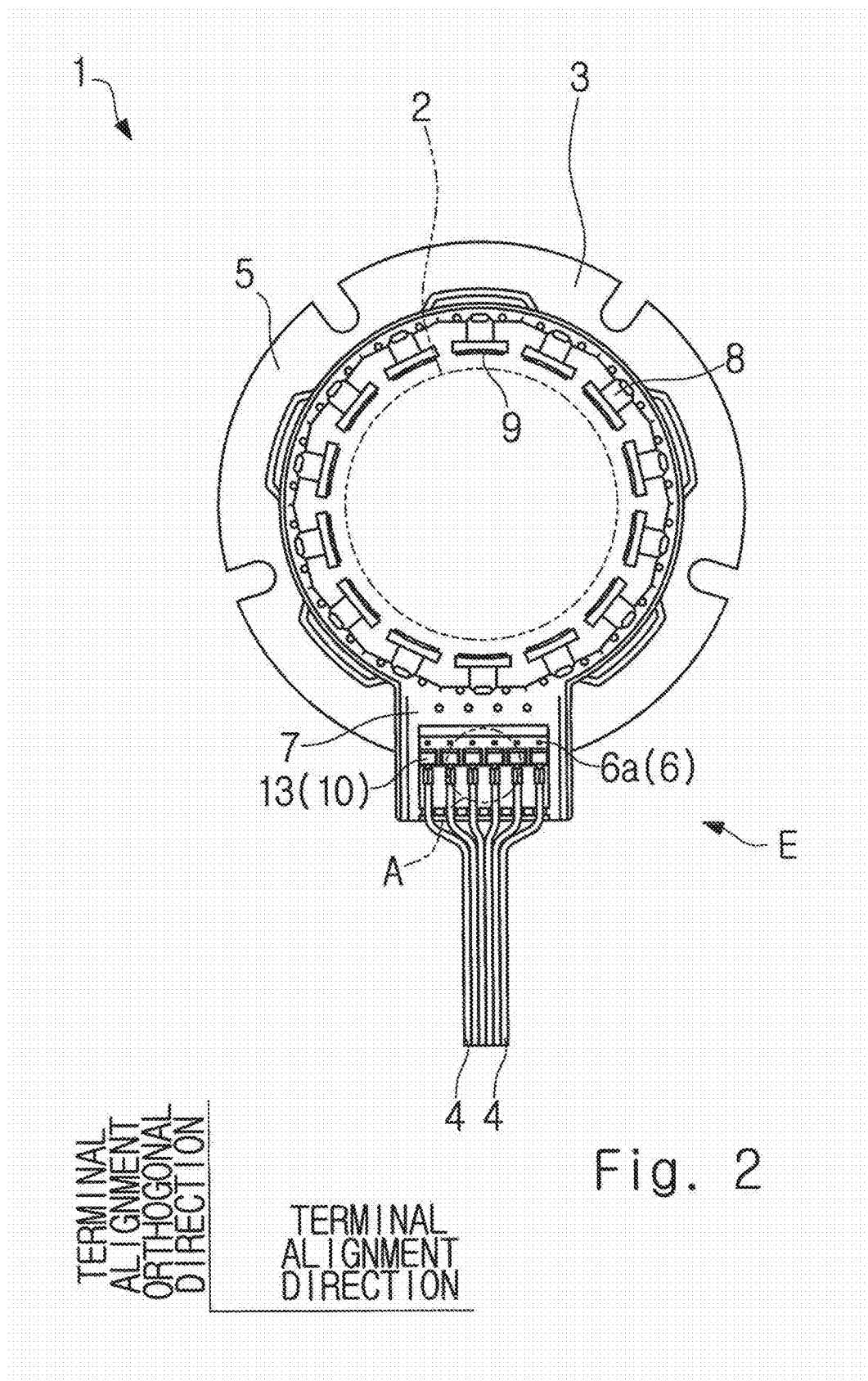
FIG. 2 is a plan view of the resolver (first embodiment)

As shown in FIGS. 1 and 2, a resolver 1 serving as an angle detection device includes a resolver rotor 2 indicated by an alternate long and two short dashes line, a ring-shaped resolver stator 3, and a plurality of external cables 4. The resolver rotor 2 is formed as a part of an output shaft of a motor (not shown). The resolver stator 3 is fixed to the body of the motor and the like. The resolver stator 3 is connected with the plurality of external cables 4. In this structure, when the resolver rotator 2 rotates relative to the resolver stator 3, a rotation signal corresponding to the rotation is generated in the resolver stator 3 and is output to the outside through the external cables 4.

The resolver stator 3 includes a resolver stator body 5, a plurality of resolver windings (not shown), a plurality of winding terminals 6 (first terminal), a terminal holding base 7 (a housing, a terminal holding portion), and an insulating cover 8.

The resolver stator body 5 is a stacked structure made of a magnetic material and is formed in a ring shape. The resolver stator body 5 includes a plurality of magnetic pole portions 9 which project toward the inner peripheral side.

The plurality of resolver windings are respectively wound around the plurality of magnetic pole portions 9 of the resolver stator body 5.

The plurality of winding terminals 6 are intermediate members which connect the plurality of resolver windings to the plurality of external cables 4, respectively. Each winding terminal 6 includes a winding portion 6a around which the corresponding resolver winding is wound. The winding portion 6a projects in a direction parallel to the rotation axis of the resolver rotor 2.

The terminal holding base 7 is a portion that supports the plurality of winding terminals 6. The terminal holding base 7 is formed on the periphery of the resolver stator body 5.

The insulating cover 8 is a cover that electrically insulates the resolver stator body 5 from the plurality of resolver windings. In this embodiment, the terminal holding base 7 and the insulating cover 8 are integrally formed.

The terms "rotation axis direction (first direction)", "terminal alignment direction (second direction)", and "terminal alignment orthogonal direction (third direction)" will now be defined. The rotation axis direction is a direction parallel to the rotation axis of the resolver rotor 2 as shown in FIGS. 1 and 2. In the rotation axis direction, a direction in which the winding portion 6a of each winding terminal 6 projects is defined as a rotation axis projecting direction, and a direction opposite to the rotation axis projecting direction is defined as a rotation axis anti-projecting direction. The terminal alignment direction is a direction in which the plurality of winding terminals 6 are arranged. The terminal alignment direction is orthogonal to the rotation axis direction. The terminal alignment orthogonal direction is a direction orthogonal to each of the rotation axis direction and the terminal alignment direction.

Each cable terminal 10 (second terminal) is attached to an end of the corresponding external cable 4. Each cable terminal 10 is spot-welded to the corresponding winding terminal 6 in a state where each cable terminal 10 is temporarily held by the terminal holding base 7, thereby electrically connecting the resolver windings to the external cables 4, respectively.

In this embodiment, a terminal temporary holding structure E includes at least the winding terminals 6, the terminal holding base 7, and the cable terminals 10.

(Terminal Temporary Holding Structure E)

Next, the terminal temporary holding structure E will be described in detail.

Figure 3:
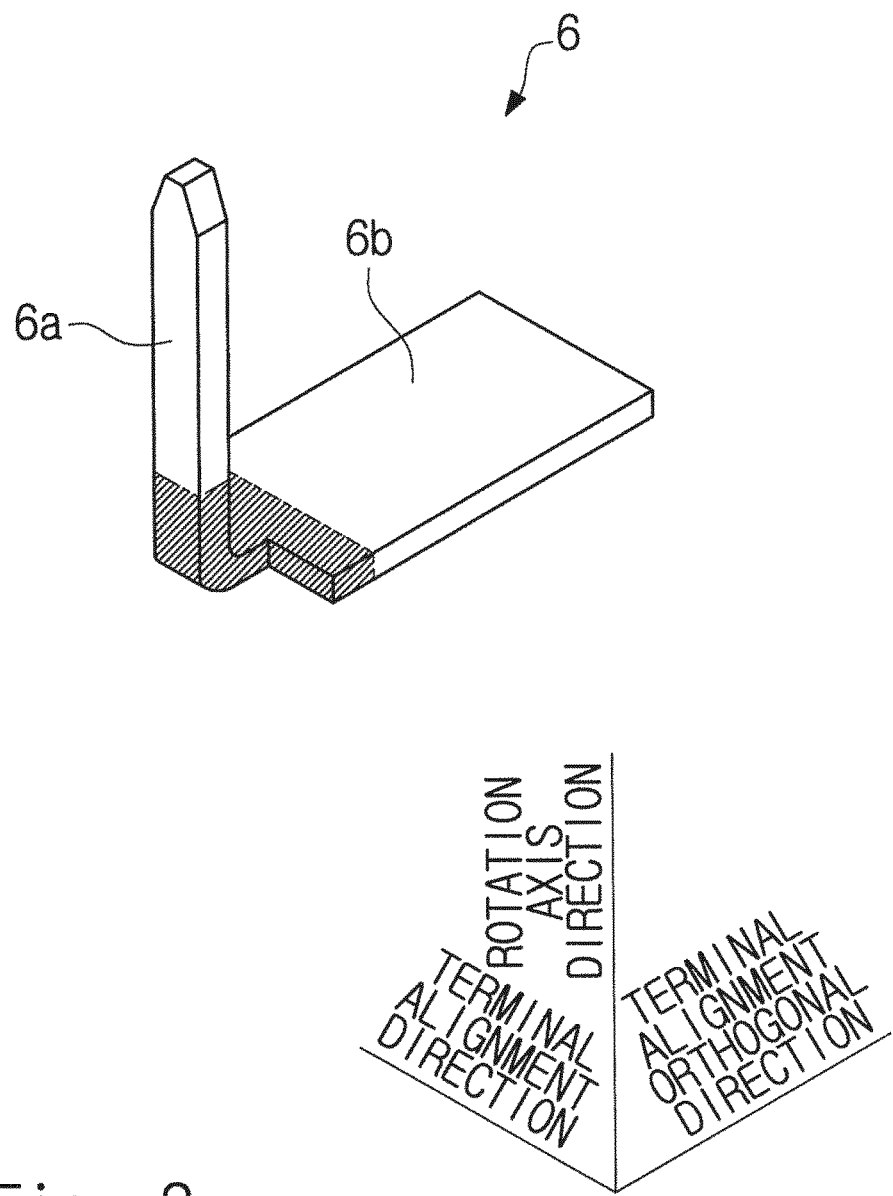
FIG. 3 is a perspective view of a winding terminal (first embodiment)

As shown in FIG. 3, each winding terminal 6 includes the winding portion 6a and a winding-side spot-welded portion 6b (first welded portion). The winding portion 6a is a portion around which the corresponding resolver winding is wound. The winding portion 6a is formed to be elongated in the rotation axis direction. The winding-side spot-welded portion 6b is a portion where the winding terminal 6 and the cable terminal 10 are spot-welded. The winding-side spot-welded portion 6b is formed in a flat plate shape orthogonal to the rotation axis direction. The winding-side spot-welded portion 6b has a rectangular shape. The longitudinal direction of the winding-side spot-welded portion 6b is parallel to the terminal alignment orthogonal direction. The winding portion 6a and the winding-side spot-welded portion 6b are integrally formed so as to be orthogonal to each other. Referring to FIG. 3, the hatched area of the winding terminal 6 indicates a portion to be embedded in the terminal holding base 7. The winding terminal 6 is partially embedded in the terminal holding base 7, so that the winding terminal 6 is held by the terminal holding base 7 (also see FIG. 7).

Figure 4:
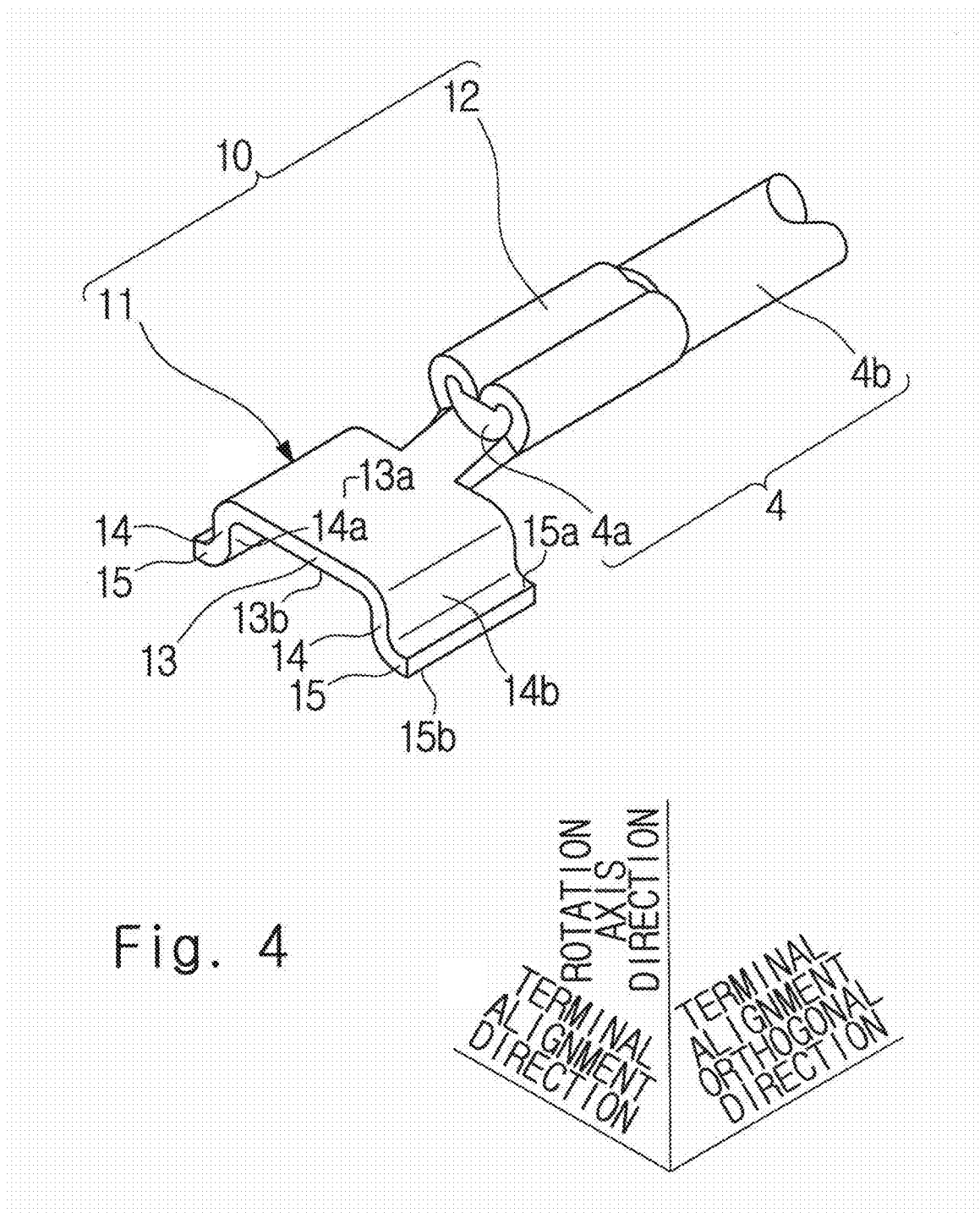
FIG. 4 is a perspective view of a cable terminal attached to an end of an external cable (first embodiment)

As shown in FIG. 4, each external cable 4 includes a central conductor 4a and an external coating 4b. Each cable terminal 10 is attached to an end of the corresponding external cable 4. Each cable terminal 10 includes a cable terminal body 11 and an open barrel 12. The cable terminal body 11 and the open barrel 12 are integrally formed by plate bending. The open barrel 12 is a portion that is attached to the central conductor 4a of the corresponding external cable 4 by crimping. The cable terminal body 11 includes a cable-side spot-welded portion 13 (second welded portion), a pair of elastic connecting portions 14, and a pair of temporary held portions 15. The cable-side spot-welded portion 13 is a portion where the winding terminal 6 and the cable terminal 10 are spot-welded. The cable-side spot-welded portion 13 is formed in a flat plate shape orthogonal to the rotation axis direction. The cable-side spot-welded portion 13 has an upper surface 13a that faces in the rotation axis projecting direction, and a lower surface 13b that faces in the rotation axis anti-projecting direction. The pair of elastic connecting portions 14 is formed in a flat plate shape and projects in the rotation axis anti-projecting direction from both ends of the cable-side spot-welded portion 13 on the terminal alignment direction side. The pair of elastic connecting portions 14 is orthogonal to the terminal alignment direction. Each elastic connecting portion 14 has an inner surface 14a that faces inward, and an outer surface 14b that faces outward. The pair of elastic connecting portions 14 is disposed so as to sandwich the cable-side spot-welded portion 13 in the terminal alignment direction. Each of the pair of temporary held portions 15 is formed in a flat plate shape and projects from an end of a corresponding one of the pair of elastic connecting portions 14 on the rotation axis anti-projecting direction side in such a manner that the temporary held portions 15 are separated from each other. The pair of temporary held portions 15 is orthogonal to the rotation axis direction. Each temporary held portion 15 has an upper surface 15a that faces in the rotation axis projecting direction, and a lower surface 15b that faces in the rotation axis anti-projecting direction. The pair of temporary held portions 15 is disposed so as to sandwich the cable-side spot-welded portion 13 in the terminal alignment direction. The presence of the pair of elastic connecting portions 14 facilitates the elastic displacement of the pair of temporary held portions 15 so that they can approach each other.

Figure 5:
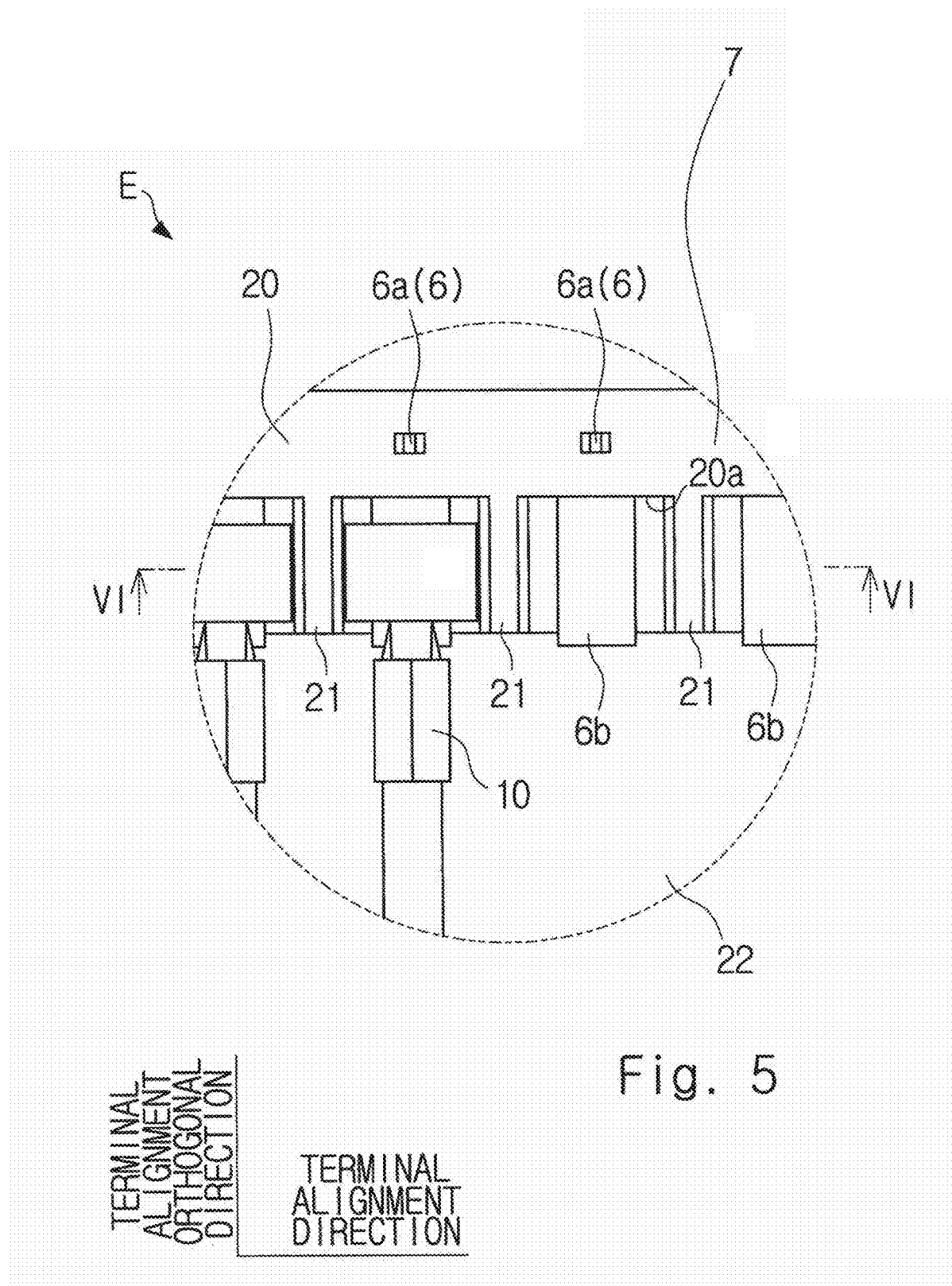
FIG. 5 is an enlarged view of a portion "A" shown in FIG. 2 (first embodiment)
Figure 6:
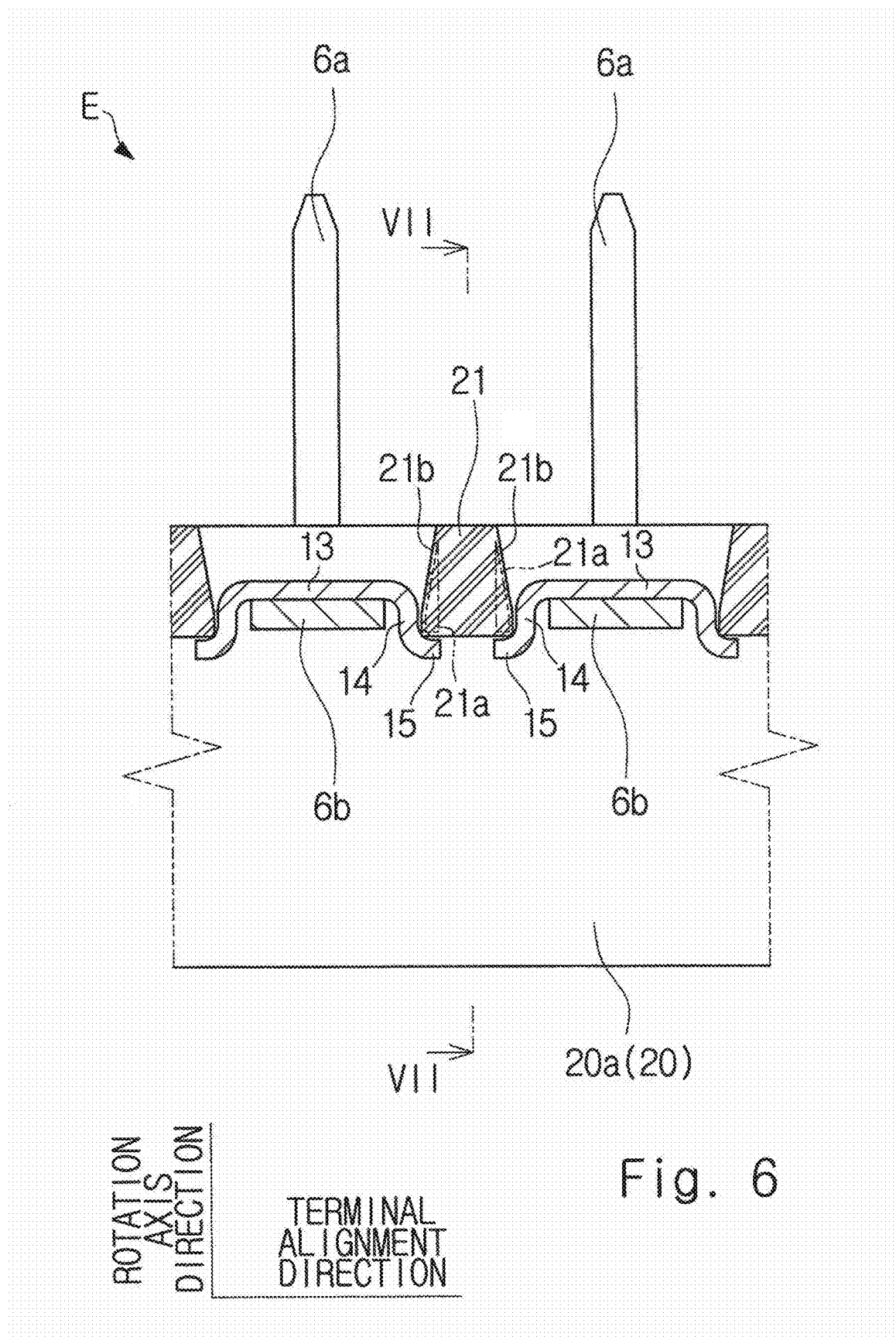
FIG. 6 is a sectional view taken along the line VI-VI of FIG. 5 (first embodiment)
Figure 7:
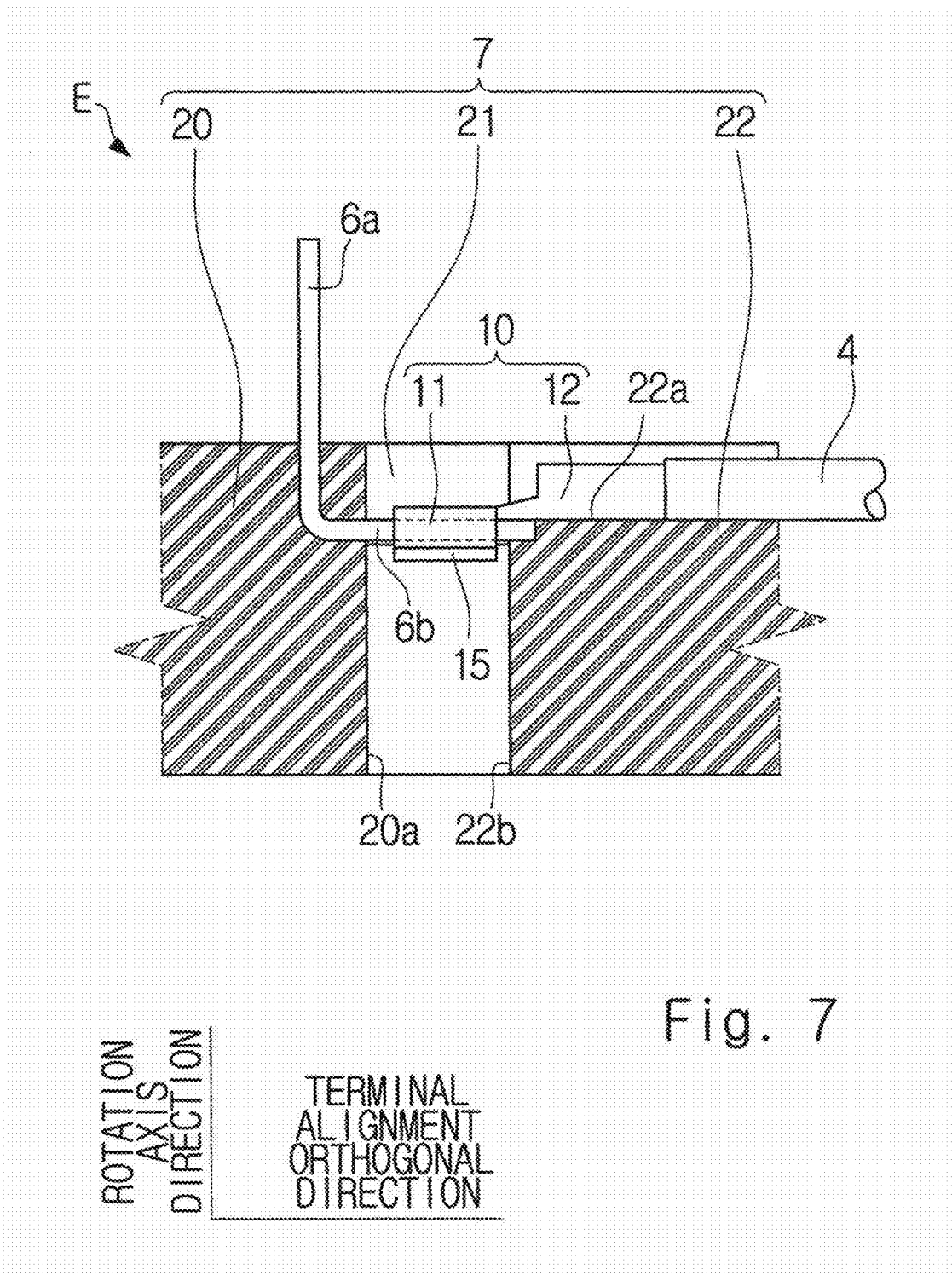
FIG. 7 is a sectional view taken along the line VII-VII of FIG. 6, in which the illustration of a temporary holding beam which appears on the front side is omitted (first embodiment)

As shown in FIGS. 5 to 7, the terminal holding base 7 includes a winding terminal holding portion 20 in which the winding terminals 6 are embedded, a plurality of temporary holding beams 21 that temporarily hold the plurality of cable terminals 10, and a barrel supporting portion 22 that supports the open barrel 12 of each cable terminal 10. As shown in FIG. 7, the winding terminal holding portion 20, the temporary holding beam 21, and the barrel supporting portion 22 are arranged in this order in the terminal alignment orthogonal direction. Note that in FIG. 5, the illustration of some cable terminals 10 is omitted for convenience of explanation.

The winding terminal holding portion 20 is a portion in which the winding portions 6a and the winding-side spot-welded portions 6b of the winding terminals 6 are partially embedded to thereby support the winding terminals 6. The winding terminal holding portion 20 has a winding-side opposed surface 20a that is opposed to the barrel supporting portion 22.

As shown in FIG. 7, each temporary holding beam 21 is a beam-like portion extending toward the barrel supporting portion 22 from the winding-side opposed surface 20a of the winding terminal holding portion 20. The plurality of temporary holding beams 21 are formed at predetermined intervals in the terminal alignment direction. As shown in FIG. 6, each temporary holding beam 21 is formed with a thickness that gradually increases in the rotation axis anti-projecting direction. In other words, each temporary holding beam 21 is formed to have a substantially trapezoidal shape in cross-section. Specifically, each temporary holding beam 21 includes a pair of temporary holding portions 21a indicated by an alternate long and two short dashes line. Each temporary holding portion 21a is opposed to the corresponding temporary held portion 15 of the cable terminal 10 in the rotation axis direction. Each temporary holding portion 21a is located on the rotation axis projecting direction side of the temporary held portion 15 of each cable terminal 10. Each of the pair of temporary holding portions 21a has an inclined guide surface 21b which is inclined in such a manner that the pair of temporary holding portions 21 opposed to each other in the terminal alignment direction approaches each other in the rotation axis anti-projecting direction.

As shown in FIG. 7, the barrel supporting portion 22 has a barrel supporting surface 22a and a cable-side opposed surface 22b. The barrel supporting surface 22a is a surface that is opposed to the open barrel 12 of the cable terminal 10 in the rotation axis direction and supports the open barrel 12. The cable-side opposed surface 22b is a surface that is opposed to the winding-side opposed surface 20a of the winding terminal holding portion 20.

(Operation)

Figure 8:
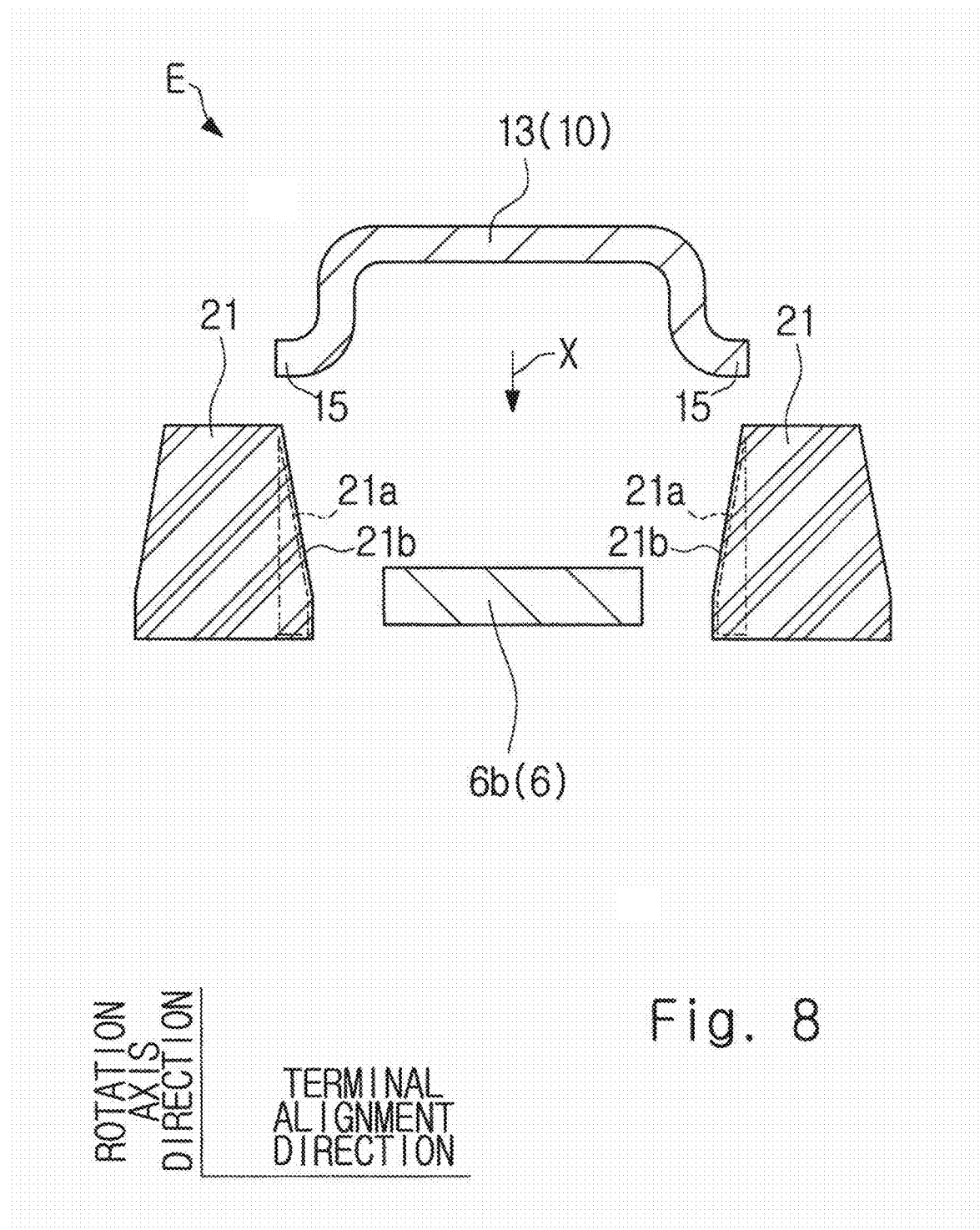
FIG. 8 is a diagram which corresponds to FIG. 6 and shows a state in which the cable terminal is opposed to the winding terminal (first embodiment)
Figure 9:
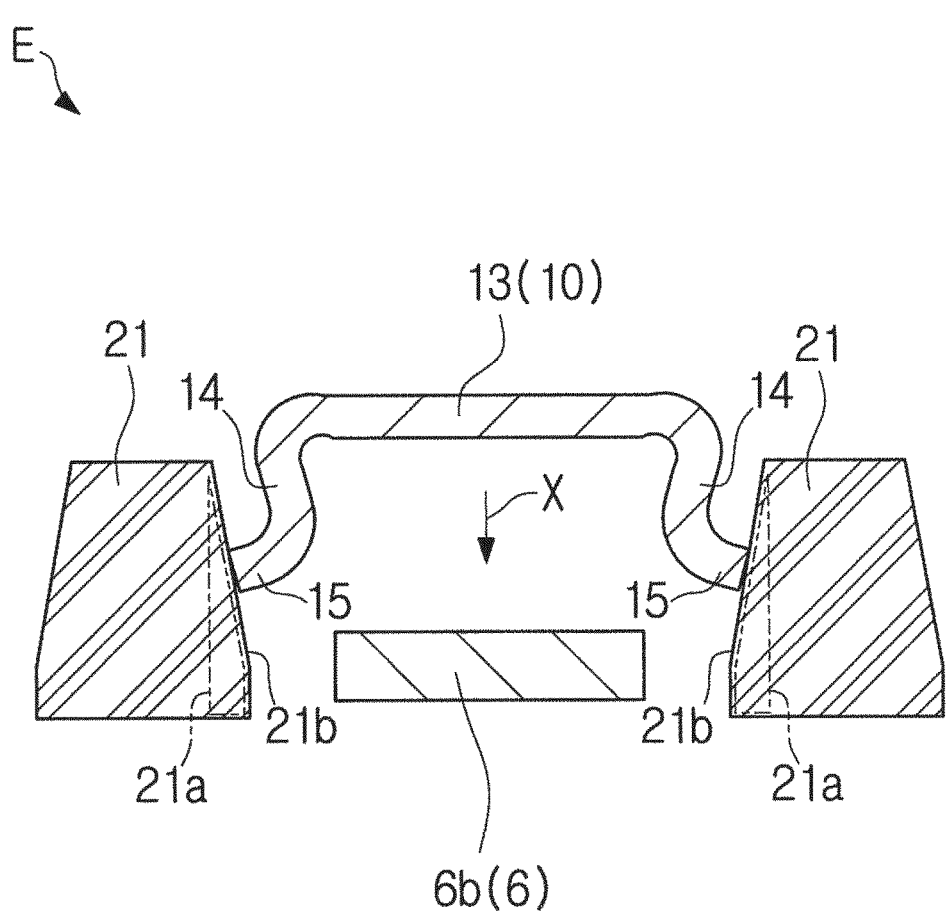
FIG. 9 is a diagram which corresponds to FIG. 6 and shows a state in which the cable terminal is elastically deformed (first embodiment)
Figure 10:
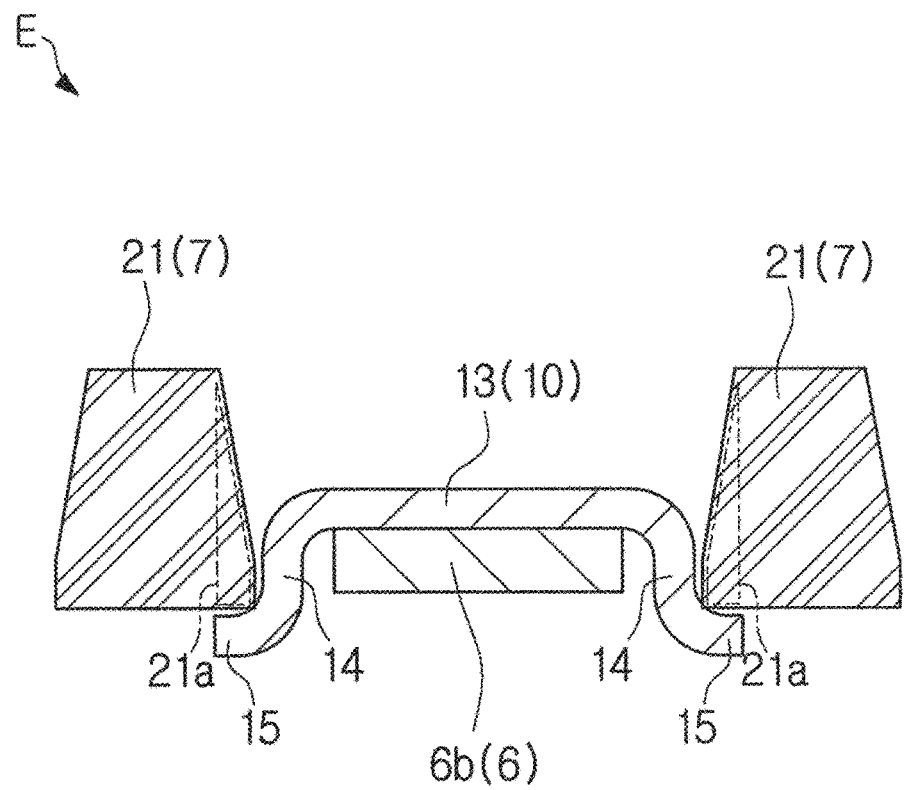
FIG. 10 is a diagram which corresponds to FIG. 6 and shows a state in which the cable terminal is temporarily held by a housing (first embodiment)

Next, a method for assembling the resolver 1 will be described. Referring first to FIG. 4, each cable terminal 10 is attached to an end of the corresponding external cable 4 by using a crimp tool. Referring next to FIG. 8, the cable terminal 10 is caused to descend in the direction indicated by an arrow X in a state where the cable-side spot-welded portion 13 of the cable terminal 10 is opposed to the winding-side spot-welded portion 6b of the winding terminal 6. Then each of the pair of temporary held portions 15 is brought into contact with a corresponding one of the inclined guide surfaces 21b of the pair of temporary holding portions 21a opposed to each other in the terminal alignment direction. When the cable terminal 10 is caused to descend continuously in the direction indicated by the arrow X, the pair of temporary held portions 15 is elastically displaced so as to approach each other due to a reaction from each inclined guide surface 21b as shown in FIG. 9. Further, the cable terminal 10 is caused to descend continuously in the direction indicated by the arrow X. Then, when the pair of temporary held portions 15 has passed over the temporary holding portions 21a as shown in FIG. 10, the pair of temporary held portions 15 is elastically displaced in such a manner that the temporary held portions 15 are separated from each other, and the cable-side spot-welded portion 13 is seated on the winding-side spot-welded portion 6b of the winding terminal 6, so that the cable-side spot-welded portion 13 and the winding-side spot-welded portion 6b of the winding terminal 6 are opposed to each other in the rotation axis direction. The cable-side spot-welded portion 13 is located on the rotation axis projecting direction side of the winding-side spot-welded portion 6b of the winding terminal 6. In the state where the cable terminal 10 is temporarily held by the terminal holding base 7 and the winding terminal 6, the cable-side spot-welded portion 13 of the cable terminal 10 is located on the rotation axis projecting direction side relative to the winding-side spot-welded portion 6b of the winding terminal 6, and the temporary held portions 15 of the cable terminal 10 are located on the rotation axis anti-projecting direction side relative to the temporary holding portions 21a of the temporary holding beams 21. Accordingly, the cable terminal 10 is sandwiched between the terminal holding base 7 and the winding terminal 6 in the rotation axis direction.

At this time, if an external force acts on the external cable 4, for example, and an external force acts on the cable-side spot-welded portion 13 in the rotation axis projecting direction, the pair of temporary held portions 15 is hooked on the pair of temporary holding portions 21a, which inhibits the cable terminal 10 from further ascending in the rotation axis projecting direction. At this time, if an external force acts on the external cable 4, for example, and an external force acts on the cable-side spot-welded portion 13 in the rotation axis anti-projecting direction, the cable-side spot-welded portion 13 abuts against the winding-side spot-welded portion 6b of the winding terminal 6, which inhibits the cable terminal 10 from further descending in the rotation axis anti-projecting direction.

At this time, if an external force acts on the external cable 4, for example, and an external force acts on the cable-side spot-welded portion 13 in the terminal alignment orthogonal direction, the pair of temporary held portions 15 is brought into contact with the winding-side opposed surface 20a or the cable-side opposed surface 22b as shown in FIG. 7, which inhibits the cable terminal 10 from further moving in the terminal alignment orthogonal direction.

At this time, if an external force acts on the external cable 4, for example, and an external force acts on the cable-side spot-welded portion 13 in the terminal alignment direction, the pair of elastic connecting portions 14 is brought into contact with the pair of temporary holding portions 21a as shown in FIG. 10, which inhibits the cable terminal 10 from further moving in the terminal alignment direction.

Lastly, in the state shown in FIG. 10, the cable-side spot-welded portion 13 and the winding-side spot-welded portion 6b of the winding terminal 6 are spot-welded by using a spot welding machine.

The first embodiment of the present invention described above has the following features.

(1) The terminal temporary holding structure E includes: the winding terminals 6 (first terminal) each including the winding-side spot-welded portion 6b (first welded portion) having a flat plate shape; the terminal holding base 7 (housing) that holds the winding terminals 6; and the cable terminals 10 (second terminal) that are respectively connected with the external cables 4 and include the cable-side spot-welded portion 13 (second welded portion) having a flat plate shape. As shown in FIG. 10, each cable terminal 10 is temporarily held by the terminal holding base 7 in such a manner that the winding-side spot-welded portion 6b and the cable-side spot-welded portion 13 are opposed to each other, so as to weld the cable-side spot-welded portion 13 of each cable terminal 10 to the winding-side spot-welded portion 6b of each winding terminal 6. Each cable terminal 10 is temporarily held by the terminal holding base 7 at at least two locations that sandwich the cable-side spot-welded portion 13. The above structure makes it possible to maintain the position of each cable terminal 10 temporarily held by the terminal holding base 7, even when an external force acts on the external cables 4.

(2) As shown in FIG. 10, the cable terminal 10 is sandwiched between the winding terminal 6 and the terminal holding base 7 in a direction orthogonal to the winding-side spot-welded portion 6b of the winding terminal 6. According to the above structure, temporal holding by the temporal holder 7 is achieved with a simple structure.

Alternatively, the cable terminal 10 may be press-fitted between the pair of temporary holding beams 21 opposed to each other. Also in this case, the position of the cable terminal 10 temporarily held by the terminal holding base 7 can be stabilized.

(3) The cable terminal 10 further includes the pair of temporary held portions 15 disposed so as to sandwich the cable-side spot-welded portion 13. The terminal holding base 7 includes the pair of temporary holding portions 21a that is opposed to the pair of temporary held portions 15 of the cable terminal 10 in the direction orthogonal to the winding-side spot-welded portion 6b of the winding terminal 6. According to the above structure, the cable terminal 10 is caused to pass between the pair of temporary holding portions 21a by utilizing the elastic displacement of the cable terminal 10, thereby making it possible to sandwich the cable terminal 10 between the winding terminal 6 and the terminal holding base 7.

(4) Further, each of the pair of elastic connecting portions 14 extending in the rotation axis direction (direction different from a direction parallel to the cable-side spot-welded portion 13) is formed between the cable-side spot-welded portion 13 and a corresponding one of the pair of temporary held portions 15. The above structure facilitates the elastic displacement of the pair of temporary held portions 15 of each cable terminal 10, thereby facilitating work for sandwiching the cable terminal 10 between the winding terminal 6 and the terminal holding base 7.

(5) As shown in FIG. 10, the winding terminal 6 is located between the pair of elastic connecting portions 14 in the state where the cable terminal 10 is temporarily held by the terminal holding base 7. The above structure suppresses relative movements of the winding terminal 6 and the cable terminal 10 in the terminal alignment direction (in a direction in which the pair of elastic connecting portions 14 faces each other).

(7) As shown in FIG. 9, each of the pair of temporary holding portions 21a has the inclined guide surface 21b which is inclined in such a manner that the pair of temporary holding portions 21a approaches each other in the direction from the cable terminal 10 to the winding terminal 6. In other words, the temporary holding portions 21a respectively have the inclined guide surfaces 21b which are inclined so as to approach each other in the rotation axis anti-projecting direction. According to the above structure, the pair of temporary held portions 15 is elastically displaced so as to approach each other, simply by pressing the cable terminal 10 in the rotation axis anti-projecting direction. This facilitates work for sandwiching the cable terminal 10 between the winding terminal 6 and the terminal holding base 7.

(8) The resolver 1 includes at least the terminal temporary holding structure E and the external cables 4 which are respectively connected to the cable terminals 10.

Second Embodiment

Next, a second embodiment of the present invention will be described with reference to FIG. 11. Here, differences between this embodiment and the first embodiment will be mainly described, while a repeat of previous descriptions is omitted. Components of this embodiment corresponding to the components of the first embodiment described above are denoted by the same reference numerals as those of the first embodiment as a rule.

Figure 11:
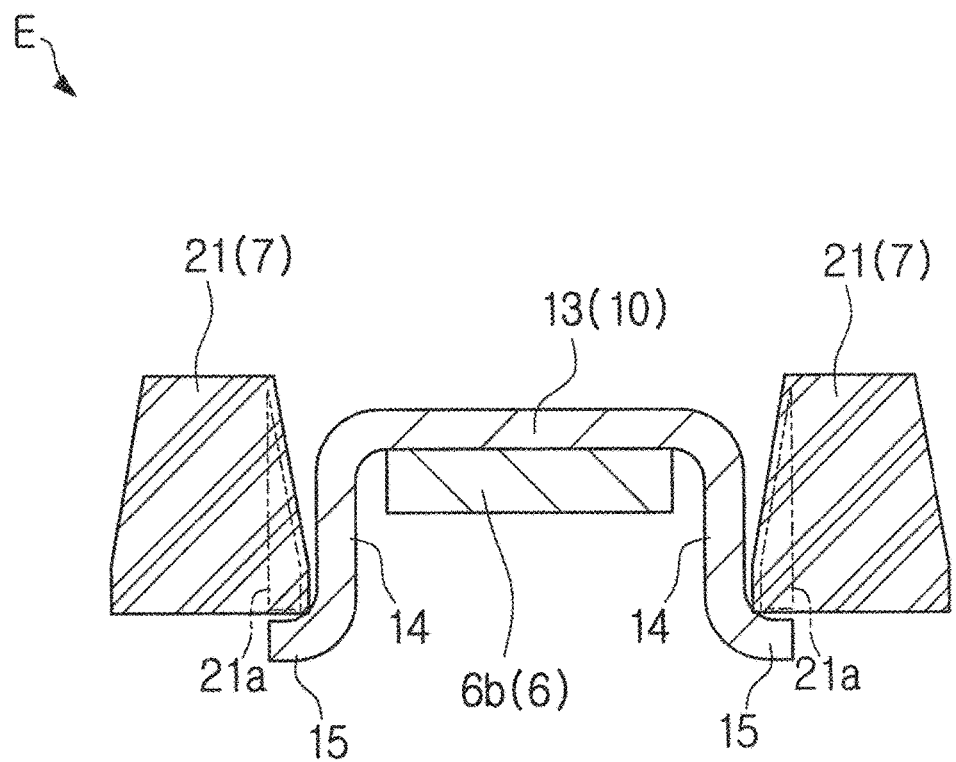
FIG. 11 is a diagram corresponding to FIG. 6 (second embodiment)

As shown in FIG. 11, the dimension of the pair of elastic connecting portions 14 in the rotation axis direction is set to be greater than that of the first embodiment, thereby further facilitating the elastic displacement of the pair of temporary held portions 15 in the direction in which the temporary held portions 15 approach each other.

Third Embodiment

Next, a third embodiment of the present invention will be described with reference to FIG. 12. Here, differences between this embodiment and the first embodiment will be mainly described, while a repeat of previous descriptions is omitted. Components of this embodiment corresponding to the components of the first embodiment described above are denoted by the same reference numerals as those of the first embodiment as a rule.

Figure 12:
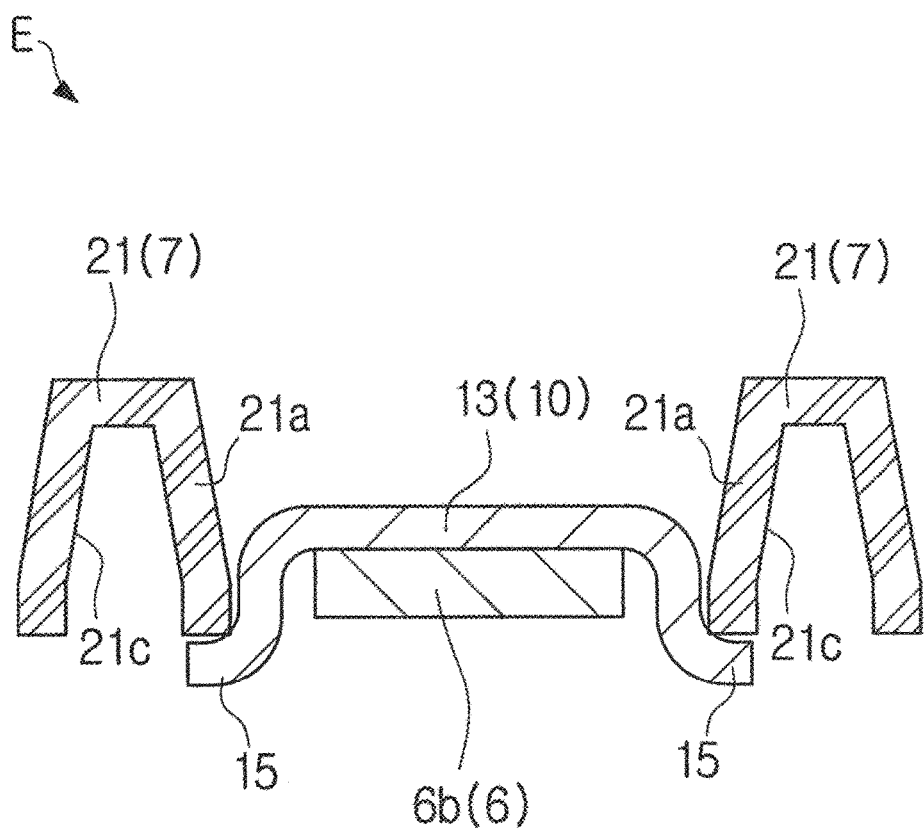
FIG. 12 is a diagram corresponding to FIG. 6 (third embodiment)

As shown in FIG. 12, the pair of temporary holding portions 21a sandwiching the winding-side spot-welded portion 6b of the winding terminal 6 in the terminal alignment direction may be formed so as to be elastically displaceable in a direction in which the temporary holding portions 21a are separated from each other. In the example shown in FIG. 12, the formation of recesses 21c, which are opened in the rotation axis anti-projecting direction, in the respective temporary holding beams 21 allows the pair of temporary holding portions 21a sandwiching the winding-side spot-welded portion 6b of the winding terminal 6 in the terminal alignment direction to be elastically displaced in the direction in which the temporary holding portions 21a are separated from each other. According to the above structure, the pair of temporary held portions 15 can more easily pass over the pair of temporary holding portions 21a, which facilitates work for sandwiching the cable terminal 10 between the winding terminal 6 and the terminal holding base 7. Note that it is preferable to form a slit (not shown) in each temporary holding portion 21a so as to facilitate the elastic displacement of the pair of temporary holding portions 21a in the direction in which the temporary holding portions 21a sandwiching the winding-side spot-welded portion 6b of the winding terminal 6 in the terminal alignment direction are separated from each other.

Fourth Embodiment

Next, a fourth embodiment of the present invention will be described with reference to FIG. 13. Here, differences between this embodiment and the first embodiment will be mainly described, while a repeat of previous descriptions is omitted. Components of this embodiment corresponding to the components of the first embodiment described above are denoted by the same reference numerals as those of the first embodiment as a rule.

Figure 13:
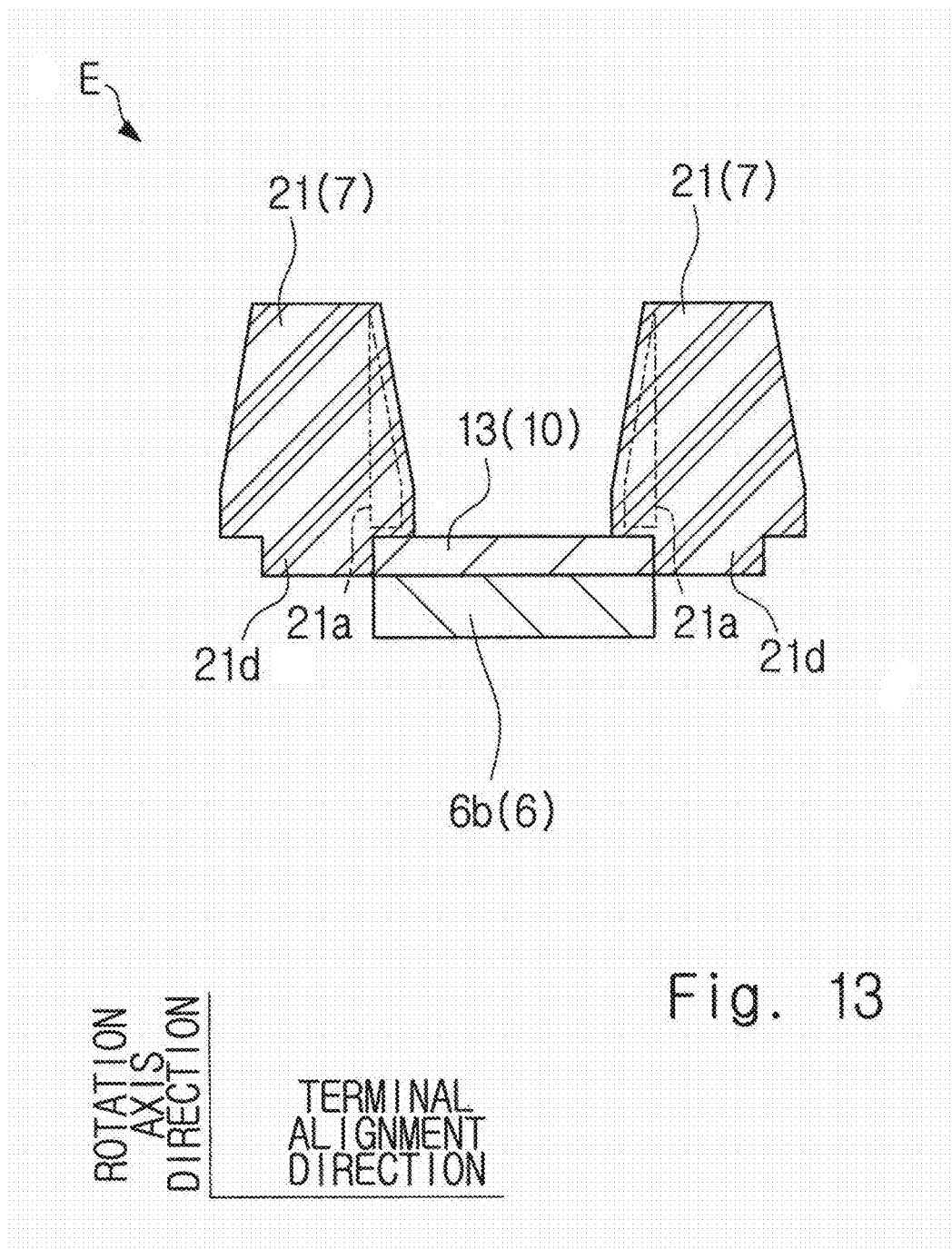
FIG. 13 is a diagram corresponding to FIG. 6 (fourth embodiment)

As shown in FIG. 13, the pair of elastic connecting portions 14 and the pair of temporary held portions 15 of each cable terminal 10 can be omitted. In this case, it is preferable that each temporary holding beam 21 be provided with a movement regulating portion 21d that is opposed to the cable-side spot-welded portion 13 in the terminal alignment direction. The movement regulating portion 21d can prevent the cable-side spot-welded portion 13, which is temporarily held by the terminal holding base 7, from moving in the terminal alignment direction.

Fifth Embodiment

Next, a fifth embodiment of the present invention will be described with reference to FIG. 14. Here, differences between this embodiment and the fourth embodiment will be mainly described, while a repeat of previous descriptions is omitted. Components of this embodiment corresponding to the components of the fourth embodiment described above are denoted by the same reference numerals as those of the fourth embodiment as a rule.

Figure 14:
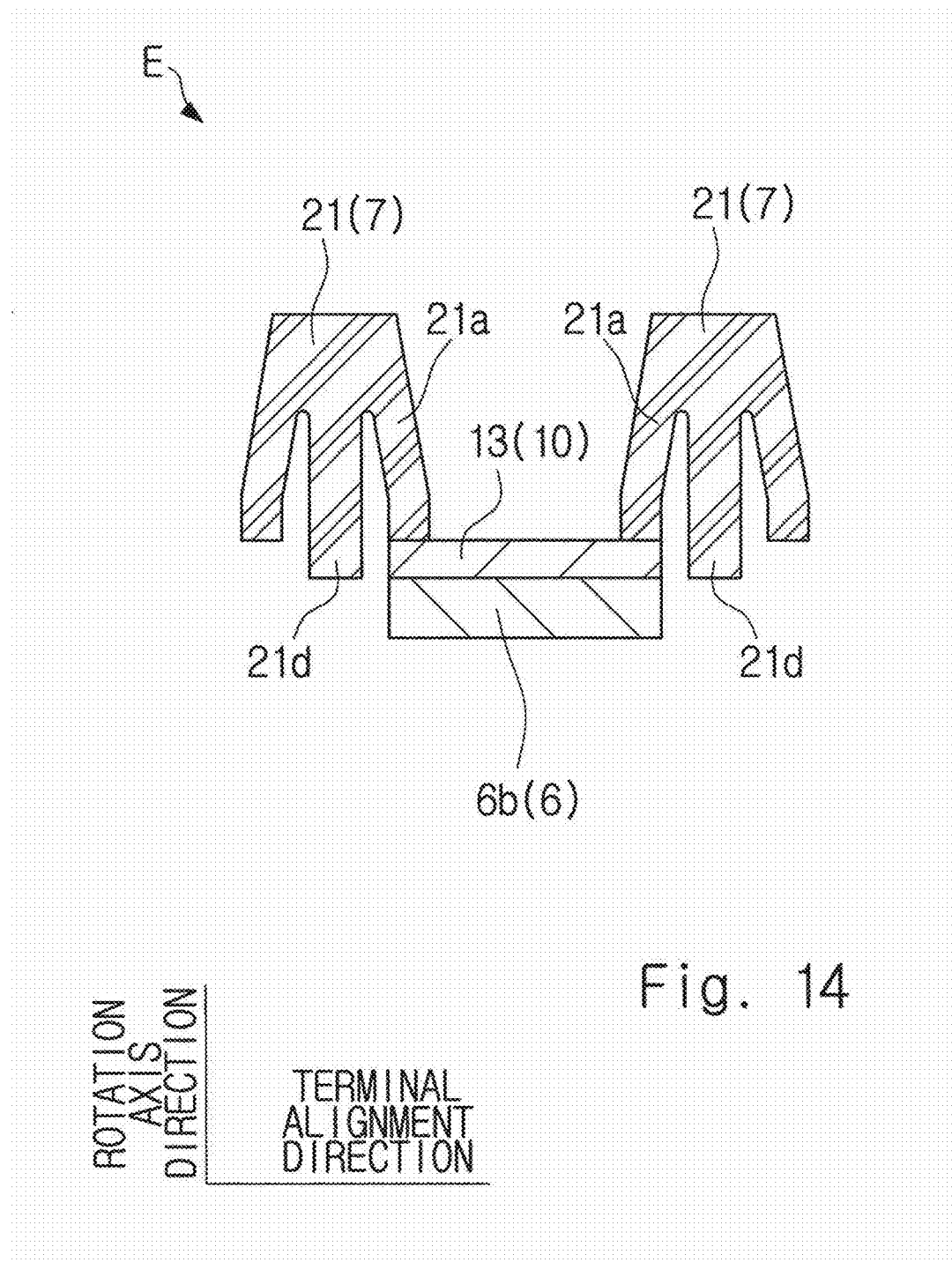
FIG. 14 is a diagram corresponding to FIG. 6 (fifth embodiment)

As shown in FIG. 14, also in the structure of the fourth embodiment described above, the pair of temporary holding portions 21a sandwiching the winding-side spot-welded portion 6b of the winding terminal 6 in the terminal alignment direction may be formed so as to be elastically displaceable in the direction in which the temporary holding portions 21a are separated from each other. According to the above structure, the cable-side spot-welded portion 13 can more easily pass over the pair of temporary holding portions 21a, which facilitates work for sandwiching the cable terminal 10 between the winding terminal 6 and the terminal holding base 7. Note that it is preferable to form a slit (not shown) in each temporary holding portion 21a so as to facilitate the elastic displacement of the pair of temporary holding portions 21a in the direction in which the temporary holding portions 21a sandwiching the winding-side spot-welded portion 6b of the winding terminal 6 in the terminal alignment direction are separated from each other.

Sixth Embodiment

Next, a sixth embodiment of the present invention will be described with reference to FIG. 15. Here, differences between this embodiment and the fifth embodiment will be mainly described, while a repeat of previous descriptions is omitted. Components of this embodiment corresponding to the components of the fifth embodiment described above are denoted by the same reference numerals as those of the fifth embodiment as a rule.

Figure 15:
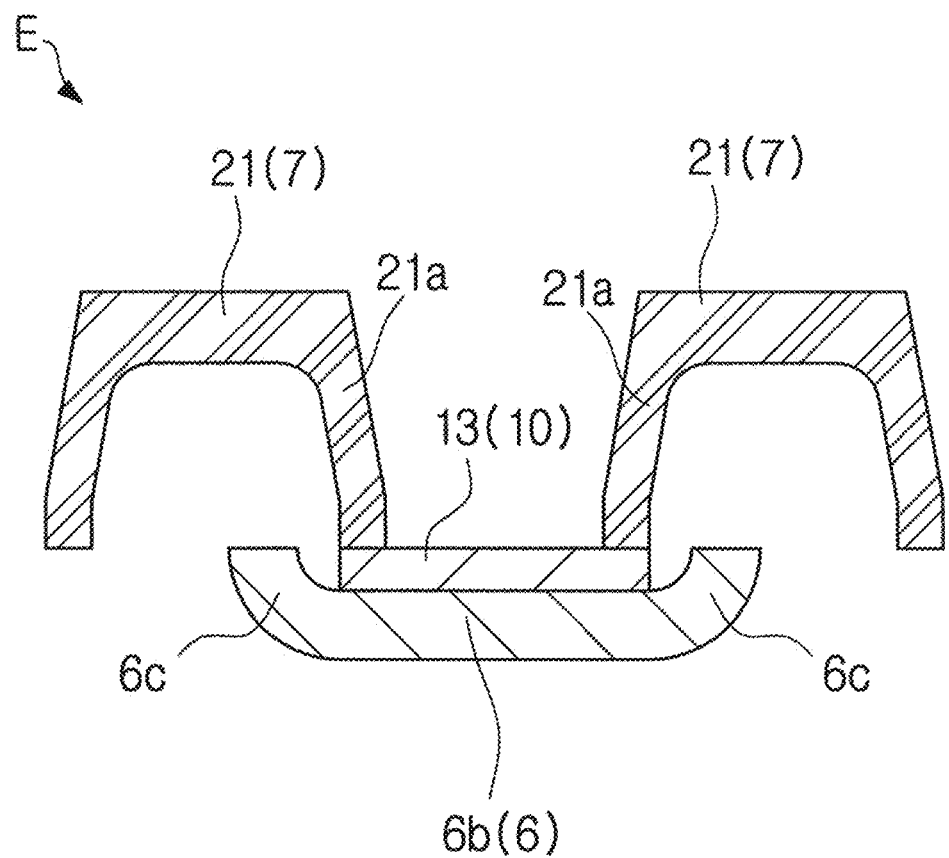
FIG. 15 is a diagram corresponding to FIG. 6 (sixth embodiment)
Figure 15:
Figure 16:
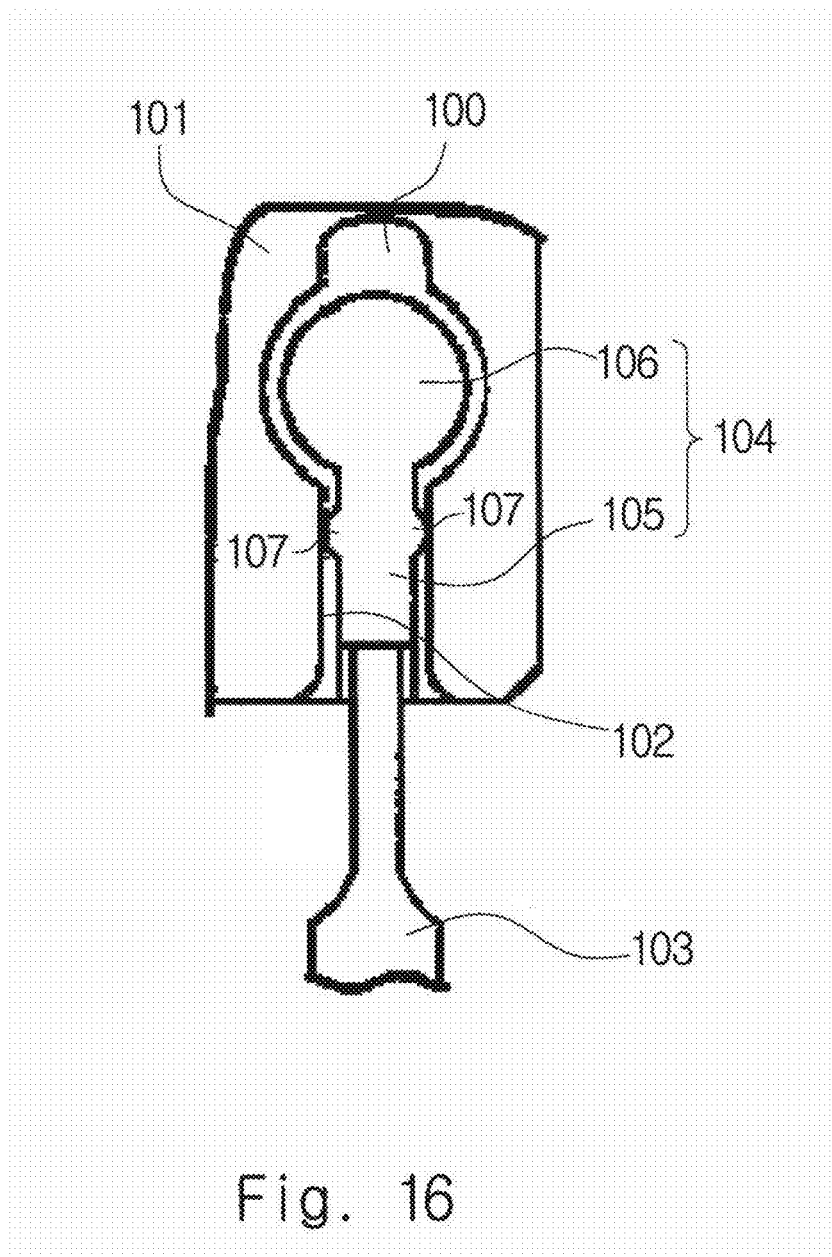
FIG. 16 is a diagram corresponding to FIG. 10 of Patent Literature 1.

As shown in FIG. 15, instead of forming the movement regulating portion 21d of the fifth embodiment, a pair of curved portions 6c, which curves in the rotation axis projecting direction, may be formed at both ends of the winding-side spot-welded portion 6b of the winding terminal 6 in the terminal alignment direction. The above structure can also prevent the cable-side spot-welded portion 13, which is temporarily held by the terminal holding base 7, from moving in the terminal alignment direction.

Lastly, referring to FIGS. 10 to 15, when the cable terminal 10 is sandwiched between the winding-side spot-welded portion 6b of the winding terminal 6 and the temporary holding portions 21a of the temporary holding beams 21 in the rotation axis direction, the cable terminal 10 is seemingly restrained from moving in the rotation axis direction. However, in practice, for convenience of manufacturing tolerance, the cable terminal 10 is temporarily held so as to be slightly movable in the rotation axis direction, while the cable terminal 10 is sandwiched between the winding-side spot-welded portion 6b of the winding terminal 6 and the temporary holding portions 21a of the temporary holding beams 21 in the rotation axis direction.

This application is based upon and claims the benefit of priority from Japanese patent application No. 2012-154733, filed on Jul. 10, 2012, the disclosure of which is incorporated herein in its entirety by reference.

REFERENCE SIGNS LIST

1 RESOLVER
2 RESOLVER ROTOR
3 RESOLVER STATOR
4 EXTERNAL CABLE
4a CENTRAL CONDUCTOR
4b EXTERNAL COATING
5 RESOLVER STATOR BODY
6 WINDING TERMINAL (FIRST TERMINAL)
6a WINDING PORTION
6b WINDING-SIDE SPOT-WELDED PORTION (FIRST WELDED PORTION)
6c CURVED PORTION
7 TERMINAL HOLDING BASE (HOUSING)
8 INSULATING COVER
9 MAGNETIC POLE PORTION
10 CABLE TERMINAL (SECOND TERMINAL)
11 CABLE TERMINAL BODY
12 OPEN BARREL
13 CABLE-SIDE SPOT-WELDED PORTION (SECOND WELDED PORTION)
13a UPPER SURFACE
13b LOWER SURFACE
14 ELASTIC CONNECTING PORTION
14a INNER SURFACE
14b OUTER SURFACE
15 TEMPORARY HELD PORTION
15a UPPER SURFACE
15b LOWER SURFACE
20 WINDING TERMINAL HOLDING PORTION
20a WINDING-SIDE OPPOSED SURFACE
21 TEMPORARY HOLDING BEAM
22 BARREL SUPPORTING PORTION

21a TEMPORARY HOLDING PORTION
21b INCLINED GUIDE SURFACE
21c RECESS
21d MOVEMENT REGULATING PORTION
22a BARREL SUPPORTING SURFACE
22b CABLE-SIDE OPPOSED SURFACE
E TERMINAL TEMPORARY HOLDING STRUCTURE
X ARROW

The invention claimed is:

1. A terminal temporary holding structure comprising:
a first terminal including a first welded portion having a flat plate shape;
a housing that holds the first terminal; and
a second terminal that is connected with an external cable and includes a second welded portion having a flat plate shape, the second terminal being temporarily held by the housing in such a manner that the first welded portion and the second welded portion are opposed to each other, so as to weld the second welded portion of the second terminal to the first welded portion of the first terminal,
wherein the second terminal is temporarily held by the housing at at least two locations that sandwich the second welded portion,
wherein the second terminal is sandwiched between the first terminal and the housing in a direction orthogonal to the first welded portion of the first terminal,
wherein the second terminal further includes a pair of temporary held portions disposed so as to sandwich the second welded portion, and
the housing includes a pair of temporary holding portions opposed to the pair of temporary held portions of the second terminal in the direction orthogonal to the first welded portion of the first terminal.

2. The terminal temporary holding structure according to claim 1, wherein a pair of elastic connecting portions extending in a direction different from a direction parallel to the second welded portion is each formed between the second welded portion and a corresponding one of the pair of temporary held portions.

3. The terminal temporary holding structure according to claim 2, wherein the first terminal is located between the pair of elastic connecting portions in a state where the second terminal is temporarily held by the housing.

4. The terminal temporary holding structure according to claim 1, wherein the pair of temporary holding portions is formed so as to be elastically displaceable in a direction in which the temporary holding portions are separated from each other.

5. The terminal temporary holding structure according to claim 1, wherein the pair of temporary holding portions has an inclined guide surface formed thereon, the inclined guide surface being inclined in such a manner that the pair of temporary holding portions approaches each other in a direction from the second terminal to the first terminal.

6. A resolver comprising:
the terminal temporary holding structure according to claim 1; and
the external cable connected to the second terminal.

* * * * *